United States Patent [19]
Fontana et al.

[11] Patent Number: 5,978,728
[45] Date of Patent: Nov. 2, 1999

[54] DETONATION DETECTION METHOD FOR INTERNAL COMBUSTION ENGINES

[75] Inventors: Roberto Fontana, Turin; Gianluca Morra, Avigliana; Stefano Re Fiorentin, Grugliasco, all of Italy

[73] Assignee: C.R.F. Societa Consortile per Azioni, Orbassano, Italy

[21] Appl. No.: 09/077,543

[22] PCT Filed: Nov. 29, 1996

[86] PCT No.: PCT/IT96/00235

§ 371 Date: Jun. 1, 1998

§ 102(e) Date: Jun. 1, 1998

[87] PCT Pub. No.: WO97/21084

PCT Pub. Date: Jun. 12, 1997

[30] Foreign Application Priority Data

Dec. 1, 1995 [IT] Italy ................... TO95A0962

[51] Int. Cl.$^6$ ............... G01L 23/22; F02P 5/152
[52] U.S. Cl. .............. 701/111; 73/35.04; 73/117.3
[58] Field of Search ................ 701/111; 73/35.04, 73/35.09, 35.1, 117.3; 123/406.37, 406.38

[56] References Cited

U.S. PATENT DOCUMENTS

| | | | |
|---|---|---|---|
| 4,562,818 | 1/1986 | Kohama et al. ................ | 701/111 |
| 5,134,980 | 8/1992 | Sakakibara et al. ............ | 123/406.38 |
| 5,188,080 | 2/1993 | Sakakibara et al. ............ | 123/406.38 |
| 5,386,722 | 2/1995 | Meyer et al. ................... | 73/117.3 |
| 5,608,633 | 3/1997 | Okada et al. ................... | 701/111 |
| 5,806,014 | 9/1998 | Remboski et al. .............. | 701/111 |
| 5,848,372 | 12/1998 | Ito et al. ......................... | 701/111 |

FOREIGN PATENT DOCUMENTS

| | | |
|---|---|---|
| 0 376 024 A2 | 7/1990 | European Pat. Off. . |
| 31 33 703 A1 | 3/1983 | Germany . |
| 2 252 165 | 7/1992 | United Kingdom . |

*Primary Examiner*—Willis R. Wolfe
*Attorney, Agent, or Firm*—Evenson, McKeown, Edwards & Lenahan, PLLC

[57] ABSTRACT

The method includes the steps of generating a detonation signal related to the intensity of the vibration on an engine block; wide-band filtering the detonation signal; rectifying the filtered detonation signal; integrating the rectified signal; calculating the logarithm of the integration result; calculating a mean value as a function of the calculated logarithm; calculating the values of a first and second standard-deviation-related quantity as a function of the logarithm value and the mean value; and calculating a detonation coefficient value as a function of the values of the standard-deviation-related quantities.

19 Claims, 8 Drawing Sheets

DETONATION DETECTION METHOD FOR INTERNAL COMBUSTION ENGINES

TECHNICAL FIELD

The present invention relates to a detonation detection method for internal combustion engines.

BACKGROUND ART

As is known, in certain operating conditions, internal combustion engines are subject to detonation, i.e. uncontrolled combustion of the mixture, which, when severe and occurring in numerous engine cycles, results in impaired efficiency and serious overheating of the engine, as well as reduced working life and abrupt failure of certain parts of the engine.

For this reason, several systems have been proposed or are currently being developed for detecting detonation conditions or the phenomenon itself, and so reducing the likelihood or consequences of detonation by controlling combustion parameters accordingly.

Figure 1A:
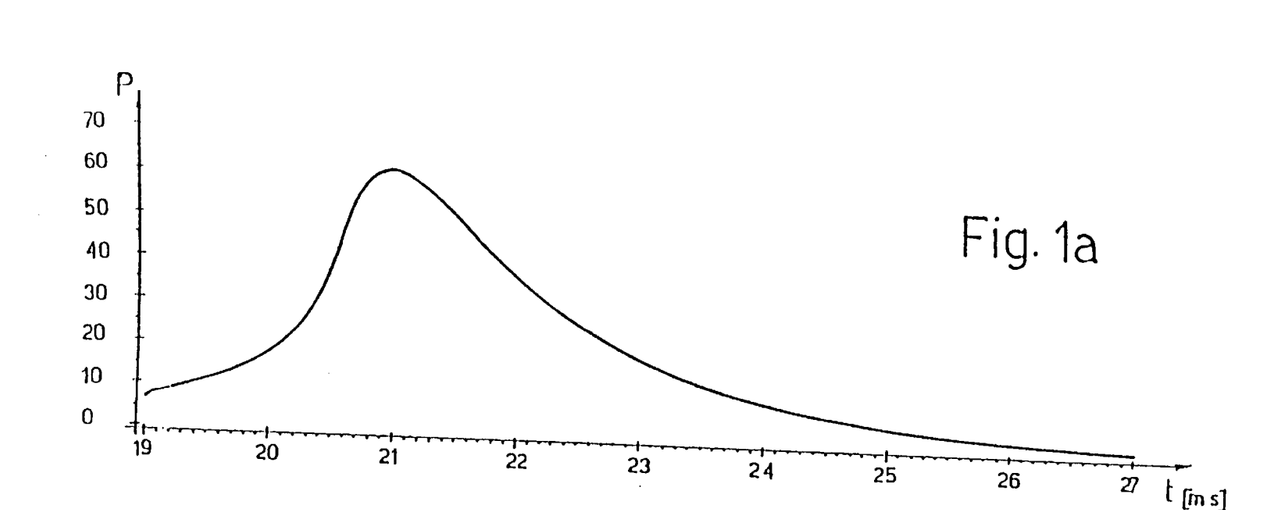
FIGS. 1a and 1b show two pressure cycle graphs in the absence and presence of detonation respectively.
Figure 1B:
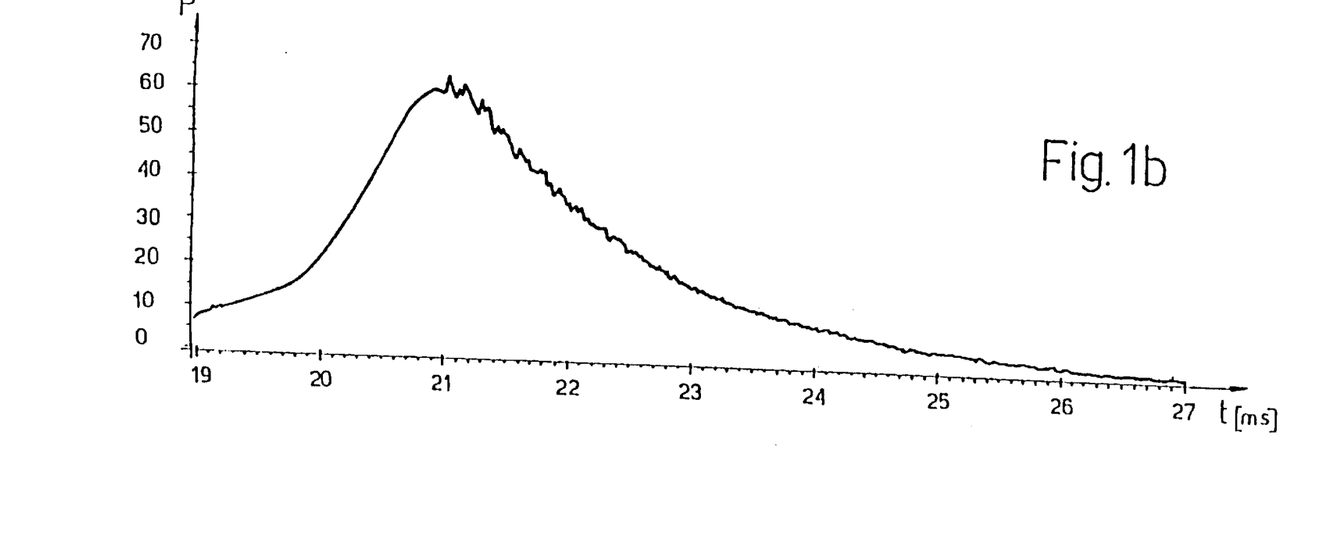

Such systems are mainly based on monitoring, directly or indirectly, the pressure as a function of piston position inside the cylinder, the cycle graph of which is bell-shaped with the peak close to the top dead center position. Under normal combustion conditions, the peak is typically rounded, whereas, in the event of detonation, it comprises a jagged edge with a large number of indentations (FIGS. 1a and 1b).

Analysis of these indentations provides useful information for the purpose of detonation detection.

Some known methods employ sensors located inside the combustion chamber to detect the amplitude of the indentations directly. Though enabling highly accurate, reliable values to be obtained, such an arrangement of the sensors involves sophisticated high-cost technology, and is therefore restricted to laboratory use or prototypes.

Other methods employ vibration sensors fitted to the engine block, which, though technically simpler and cheaper, involves greater disturbance of the readings as compared with direct direction, due to the vibration measured on the block also being caused by other phenomena in addition to the block-filtered variation in pressure inside the cylinder.

Patent GB-A-2 265 006, filed by Nippondenso Co. Ltd, relates, for example, to a detonation control system employing detonation sensors on the engine block, and which detects detonation by comparing the intensity of the sensor signal with a decision threshold, and eliminates detonation by controlling engine parameters, such as injection advance. More specifically, the system performs a logarithmic conversion of the intensity of the sensor signal, works out its distribution, calculates a value corresponding to the standard deviation of said distribution, and compares said value with a threshold calculated on the basis of the previously calculated value and a mean value of said distribution.

Distribution is determined by processing numeric values representing the amplitude of spectral components obtained by narrow-band filtration of the output signal of the sensors; which signal is composed of numerous harmonics, and is narrow-band filtered to only extract the harmonic with the highest energy content.

In the above patent, the mean value and standard deviation are calculated with reference to one engine cycle at a time, and by adapting the detonation threshold at each cycle.

In certain cases, however, controlling operation of the engine on the basis of one spectrum frequency and one engine cycle at a time is restrictive.

That is, concentrating on one frequency may result in others, also energized by detonation, being disregarded; and controlling the engine by simply eliminating local detonation cycle by cycle may not always be the best solution, in the sense that engine efficiency is at times better promoted by allowing a given number of detonations every so many engine cycles and/or in only certain cylinders. Trace detonation, in fact, by permitting a high degree of efficiency, is a favourable engine operating condition and therefore one to be exploited.

Finally, adapting the decision threshold involves extensive numeric processing, which further complicates implementation of the method.

DISCLOSURE OF INVENTION

It is an object of the present invention to provide a detonation detection method for internal combustion engines, designed to eliminate the aforementioned drawbacks, and which provides for optimum control of detonation.

According to the present invention, there is provided a detonation detection method for internal combustion engines, characterized by comprising, in combination, the steps of:

a) generating a detonation signal proportional to the intensity of a physical quantity related to the presence of detonation;

b) wide-band filtering said detonation signal to generate a first intermediate signal;

c) rectifying said first intermediate signal to generate a second intermediate signal;

d) integrating said second intermediate signal to generate a first numeric value;

e) calculating the logarithm of said first numeric value to obtain a second numeric value;

f) calculating a mean value as a function of said second numeric value;

g) calculating a value of at least a first quantity related to a standard deviation as a function of said second numeric value and said mean value; and h) calculating a value of a detonation coefficient as a function of said value of said first quantity related to the standard deviation.

BRIEF DESCRIPTION OF DRAWINGS

A preferred, non-limiting embodiment of the present invention will be described by way of example with reference to the accompanying drawings, in which.

BEST MODE FOR CARRYING OUT THE INVENTION

Figures 2, 3:
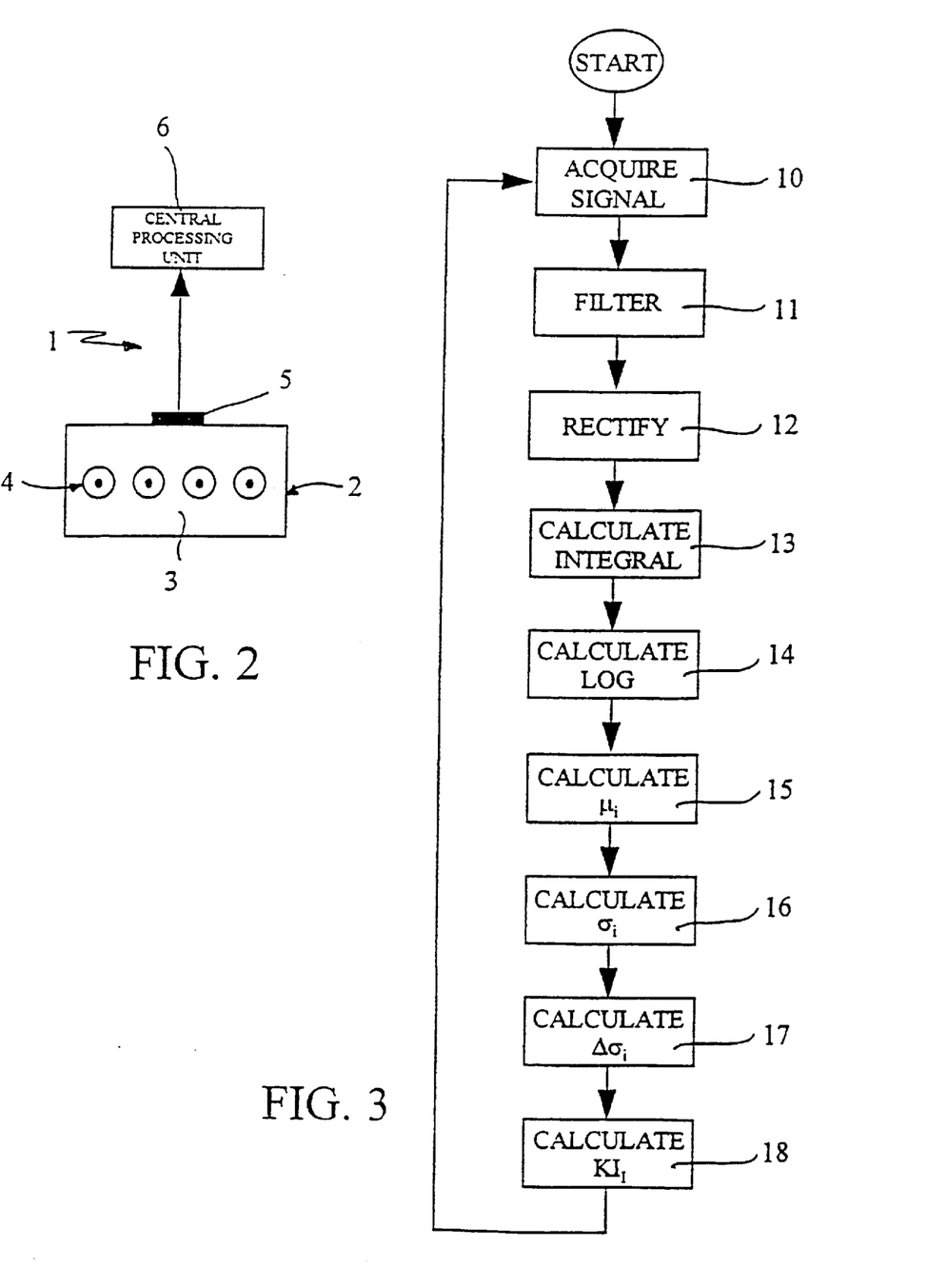
FIG. 2 shows a simplified diagram of a combustion system implementing the detection method according to the invention.
FIG. 3 shows a flow chart of a first embodiment of the detection method according to the invention.

Number 1 in FIG. 2 indicates a detonation detecting device fitted to an internal combustion engine 2, of which only the block 3 and cylinders 4 are shown.

Detecting device 1 comprises a known acceleration sensor 5 (not described in detail) fitted to block 3 of engine 2 and generating a detonation signal D related to the intensity of the vibration on block 3; and a central processing unit 6 supplied with detonation signal D and implementing the operations described below with reference to the FIG. 3 and 8 flow charts relative to the first and second embodiments respectively of the method according to the present invention.

Figure 8:
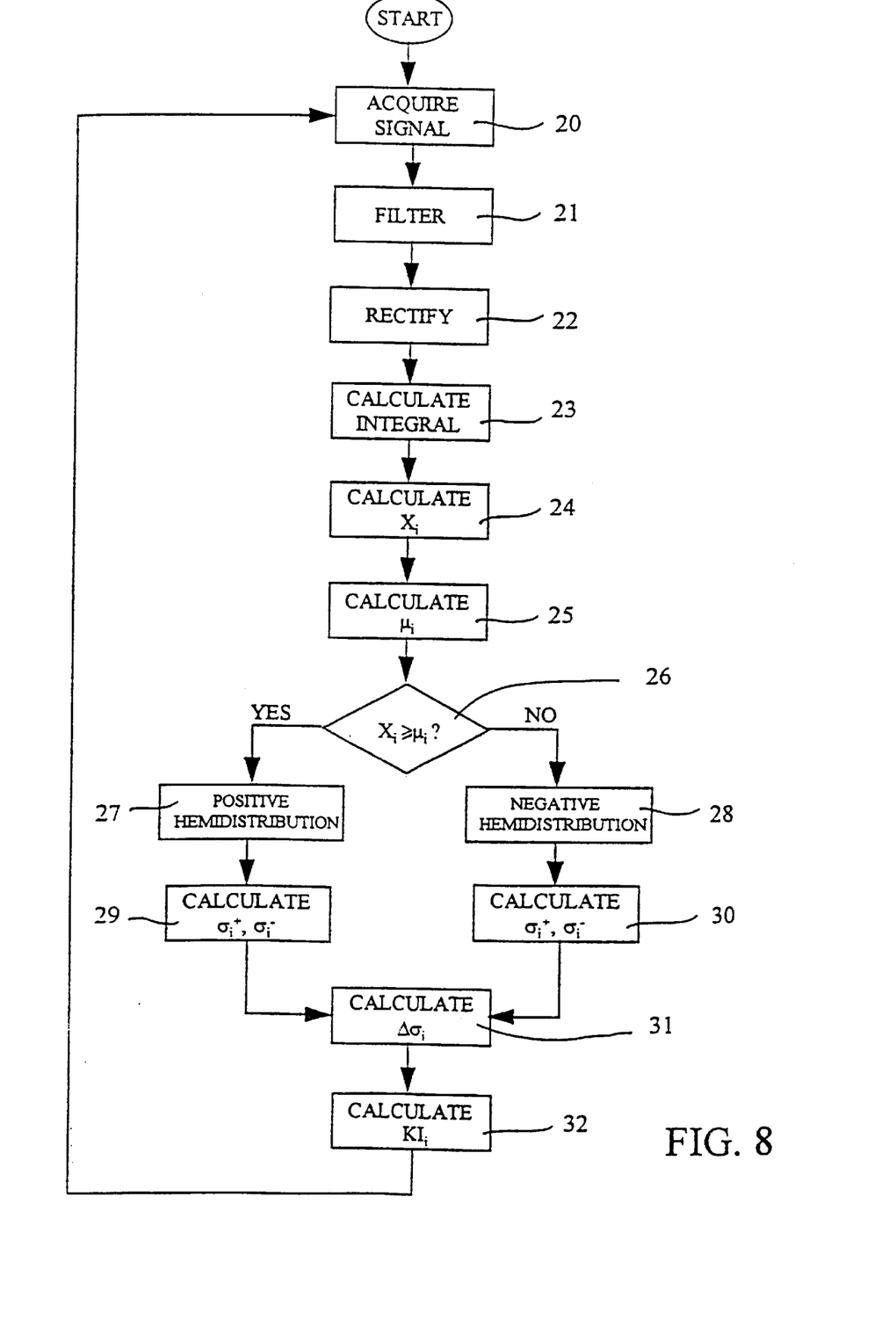
FIG. 8 shows a flow chart of a second embodiment of the detection method according to the invention.

More specifically, the operations shown in FIGS. 3 and 8 are repeated for each combustion of engine 2 to monitor detonation continually, and each value calculated in any given i-th repetition is indicated by the subscript "i".

As shown in FIG. 3 relative to the first embodiment of the method according to the invention, each combustion of engine 2 is followed by acquisition of the detonation signal D generated by acceleration sensor 5 and related to the intensity of the vibration on block 3 of engine 2 (Block 10).

Detonation signal D is then wide-band filtered (Block 11), rectified (Block 12), and integrated in a tome window (Block 13).

More specifically, the filtration bandwidth is determined experimentally as described in detail later on; and the integration time window commences alongside combustion of the relative cylinder 4, immediately after the top dead center position, and has a duration depending on the speed and load of engine 2.

The logarithm $x_i$ of the integration result is then calculated (Block 14); and, as described in detail later on, a corresponding mean value $\mu_i$ is determined as a function of logarithm value $x_i$ (Block 15), and a corresponding standard deviation value $\sigma_i$ is determined as function of mean value $\mu_i$ determined above and the calculated logarithm value $x_i$ (Block 16).

The difference $\Delta\sigma_i$ between the previously calculated standard deviation value $\sigma_i$ and a predetermined threshold value $\sigma_0$, depending on the speed and load of engine 2, is then determined (Block 17).

The resulting difference value $\Delta\sigma_i$ is then used to determine a detonation index $KI_i$ representing the detonation "propensity" of engine 2 (Block 18).

Purely by way of example, detonation index $KI_i$ may be determined using the following equation:

$$KI_i = \Delta\sigma \cdot e^{(RPM/C)} \qquad 1)$$

where RPM indicates the number of revolutions per minute of engine 2; $\Delta\sigma_i$ is the difference calculated in Block 17; and C is an appropriate constant (e.g. 1000). In this case, detonation index $KI_i$ is not dependent on engine load.

Figure 4:
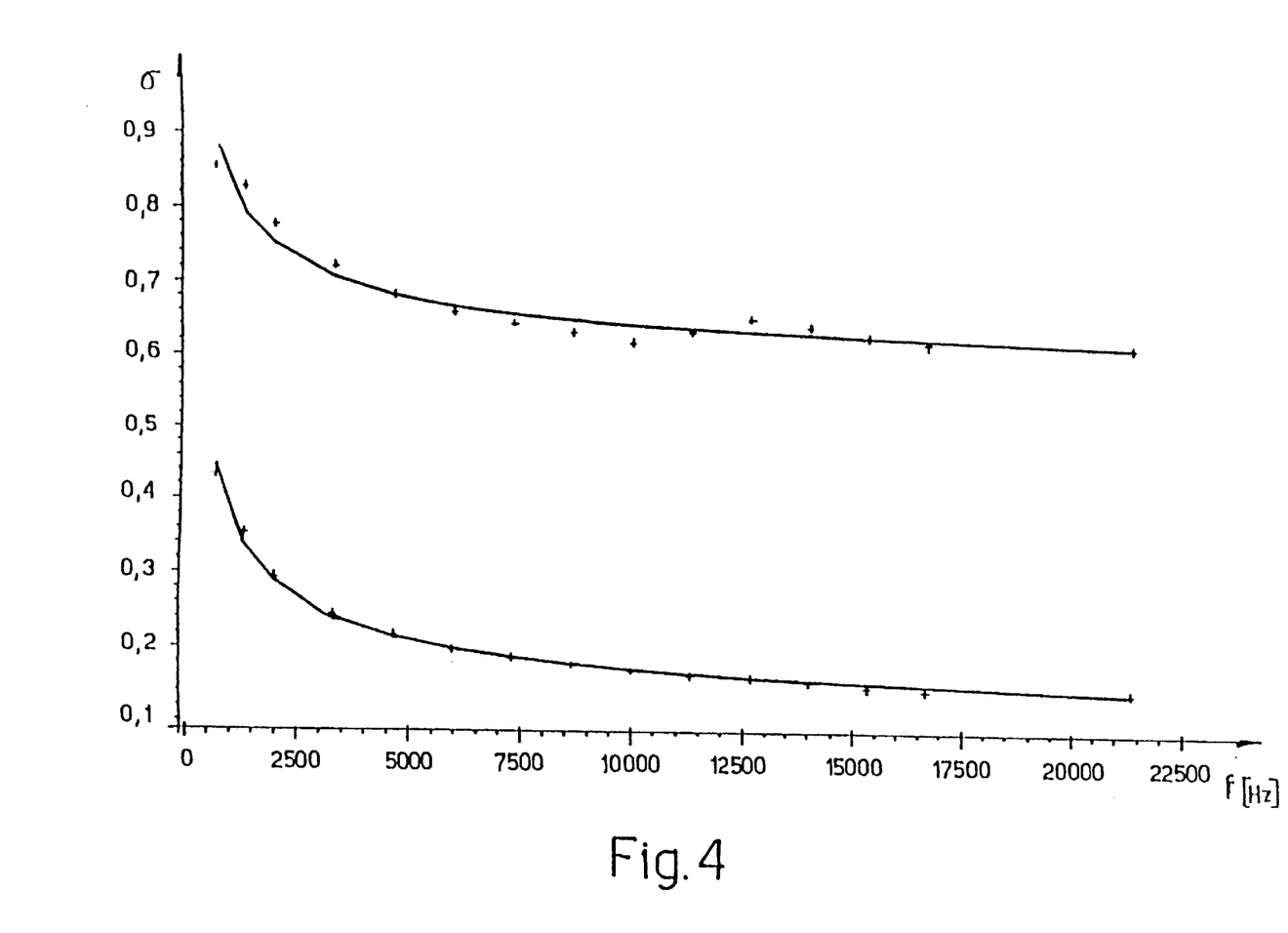
FIG. 4 shows a graph of standard deviation as a function of bandwidth relative to detonating and nondetonating cycles.

The bandwidth used for filtering detonation signal D generated by acceleration sensor 5 is determined by analyzing the curves in FIG. 4, which shows a standard deviation $\sigma_i$ versus filtration bandwidth graph relative to detonating and nondetonating cycles of engine 2. Both curves are inversely proportional to the square root of the bandwidth, and the ratio between standard deviations $\sigma_i$ in both cases increases alongside an increase in bandwidth. From the results of experiments, therefore, a band of, say, 5 to 25 kHz is preferably selected.

Mean value $\mu_i$ is calculated using the following equation:

$$\begin{cases} \mu_i = (1-\lambda_1) \cdot x_i + \lambda_1 \cdot \mu_{i-1} & i \geq 2 \\ \mu_1 = x_1 \end{cases} \qquad 2)$$

where $\mu_i$ is the mean value calculated at the i-th repetition; $\mu_{i-1}$ is the mean value calculated at the previous repetition i-1; $x_i$ is the logarithm value calculated at the i-th repetition; and $\lambda_1$ is a predetermined parameter.

As shown in the above equation, at the first repetition, the calculated mean value $\mu_i$ matches the calculated logarithm value $x_i$, whereas, from the second repetition onwards, mean value $\mu_i$ is updated according to both the logarithm value $x_i$ calculated at the i-th repetition, and the mean value $\mu_{i-1}$ calculated at repetition i-1, each weighted according to parameter $\lambda_1$.

Figure 5:
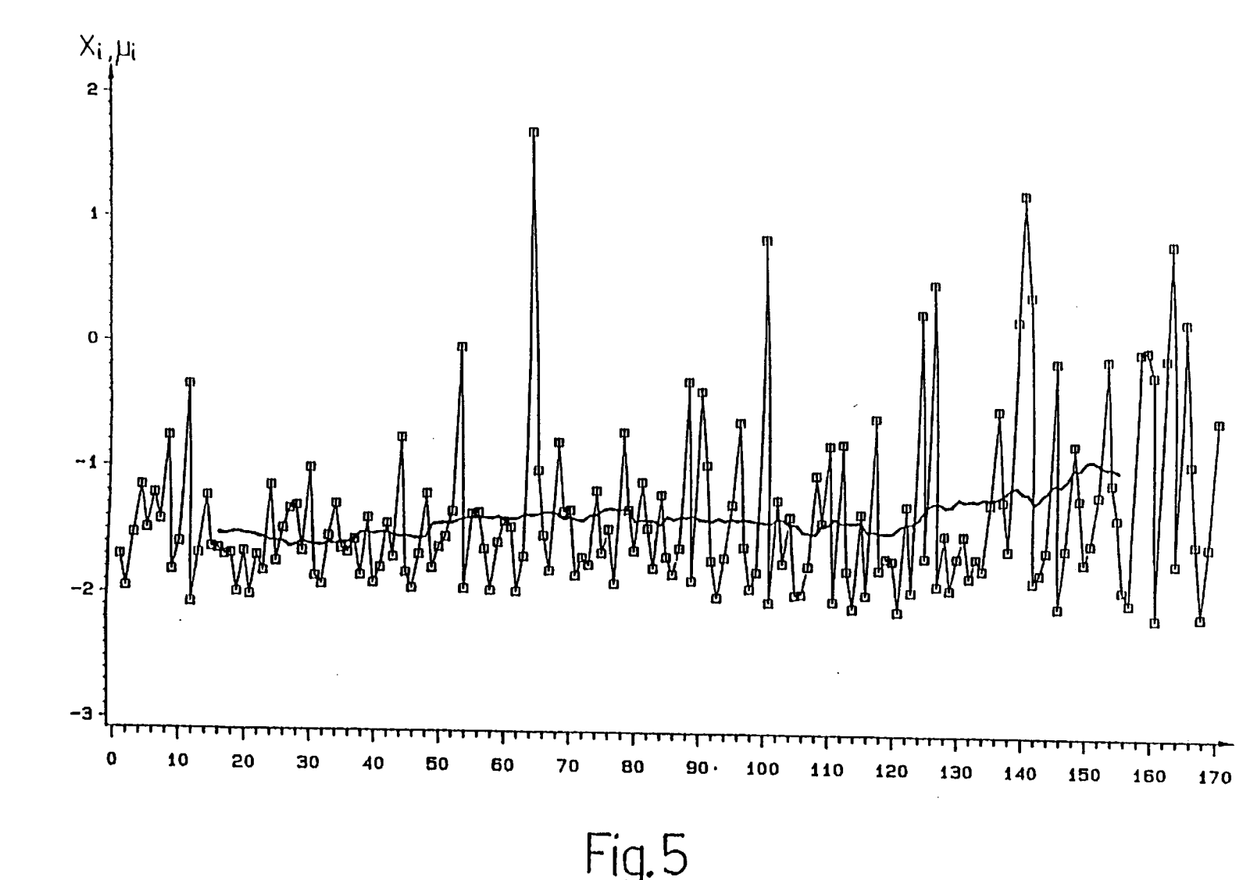
FIGS. 5, 6, 7 show graphs of a number of quantities relative to the first embodiment of the detection method according to the invention.

By way of example, FIG. 5 shows a graph of the $x_i$ values (small squares) obtained calculating the logarithm of the result of integrating filtered, rectified detonation signal D, and the time pattern (thick dark line) of mean value $\mu_i$ calculated in successive engine cycles.

Standard deviation $\sigma_i$ is calculated using the following equation:

$$\begin{cases} \sigma_i = \sqrt{\lambda_2 \cdot (x_i - \mu_i)^2 + (1-\lambda_2) \cdot \sigma_{i-1}^2} & i \geq 2 \\ \sigma_1 = 0 \end{cases} \qquad 3)$$

where $x_i$ is the logarithm value calculated at the i-th repetition; $\mu_i$ is the mean value calculated at the i-th repetition; $\sigma_i$, $\sigma_{i-1}$ and $\sigma_1$ are the standard deviation values calculated respectively at repetition i, i-1 and 1; and $\lambda_2$ is a predetermined parameter.

As shown in the above equation, at the first repetition, standard deviation value $\sigma_i$ is zero, due to the mean value matching the calculated logarithm value $x_i$, whereas, from the second repetition onwards, standard deviation value $\sigma_i$ is updated according to the logarithm value $x_i$ calculated at the i-th repetition, the mean value $\mu_i$ calculated at the i-th repetition, and the standard deviation value $\sigma_{i-1}$ calculated at repetition i-1, each weighted according to parameter $\lambda_i$.

Figure 6:
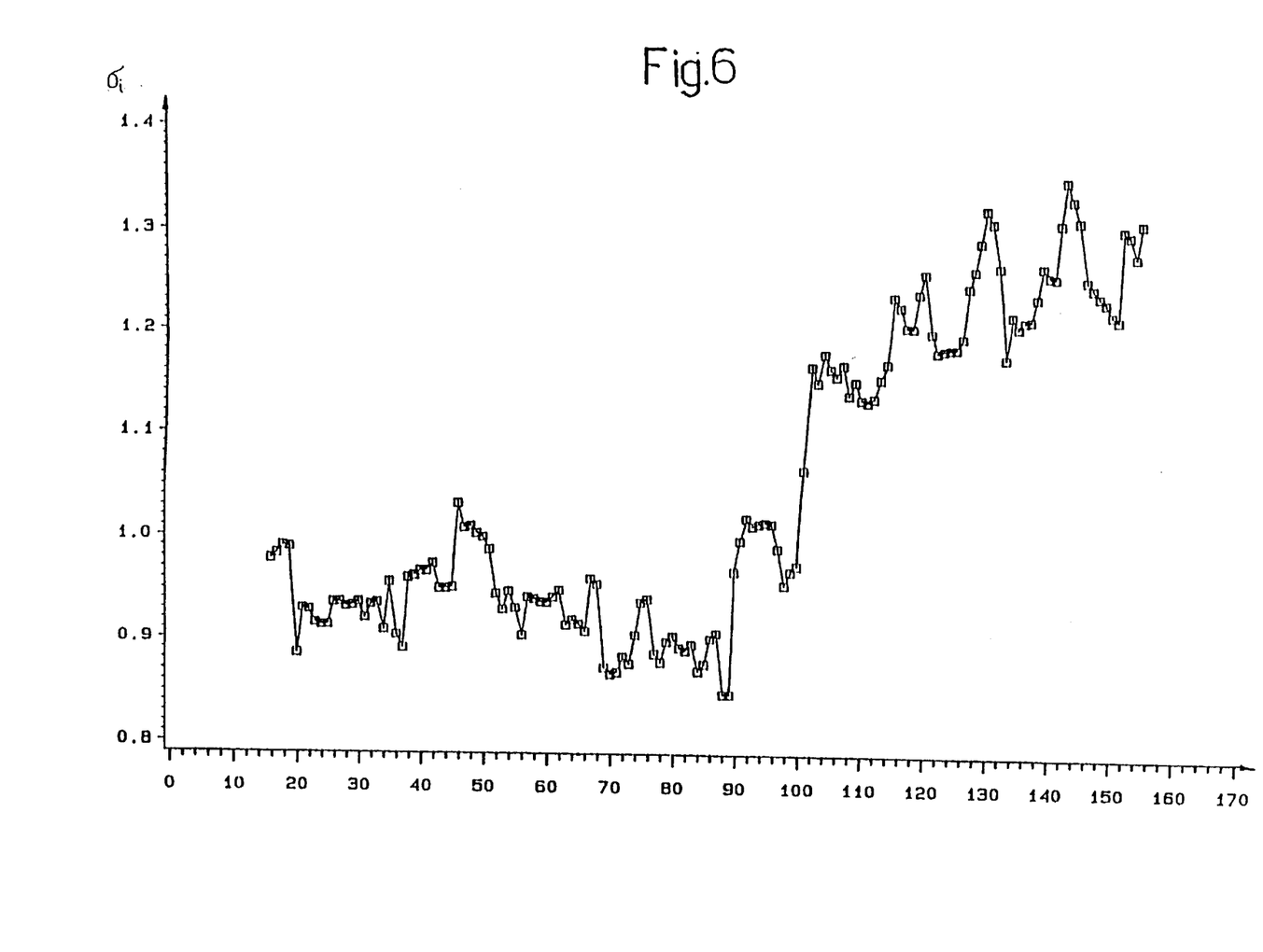
Figure 7:
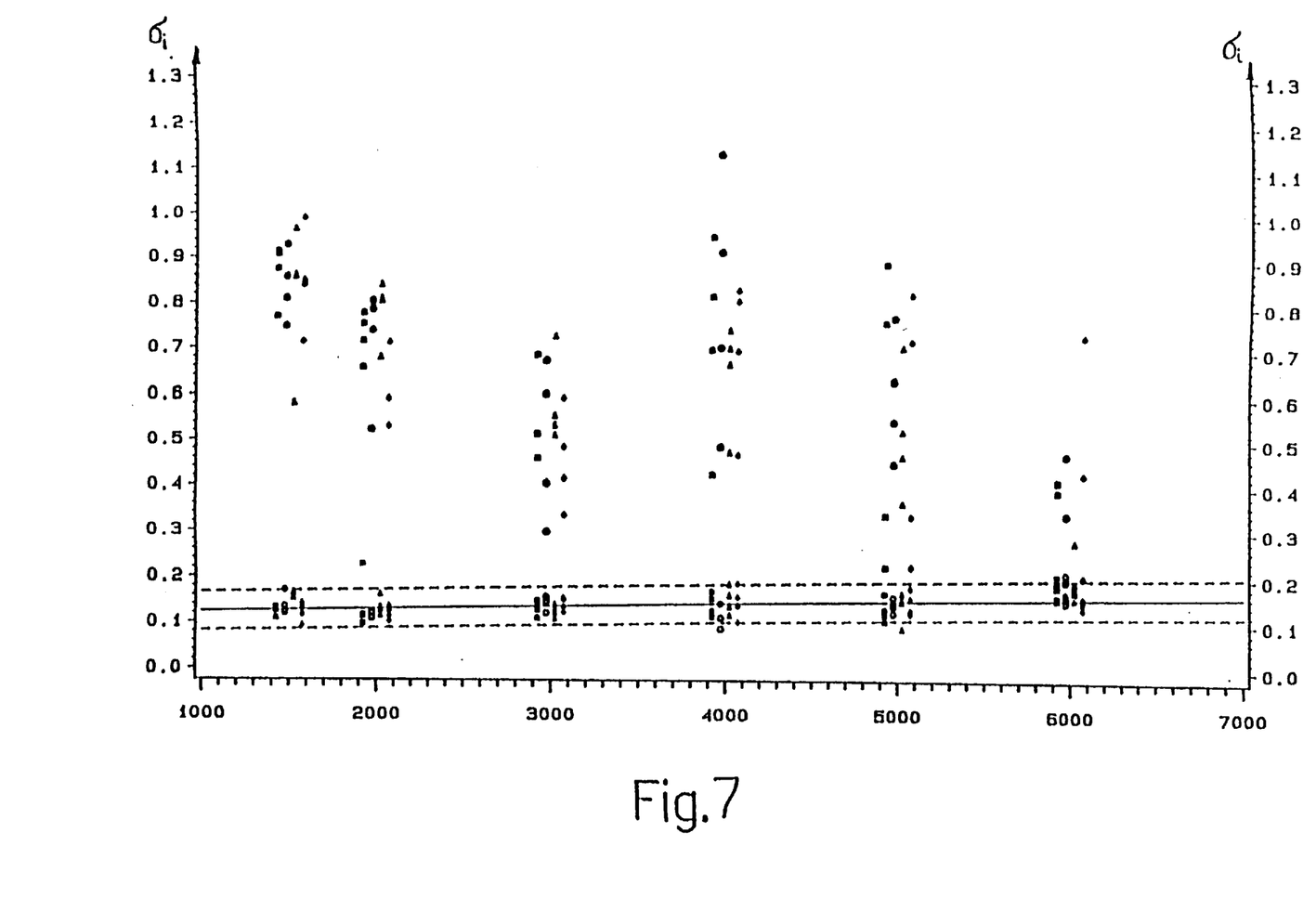

By way of example, FIG. 6 shows a graph of the standard deviation values $\sigma_i$ calculated in successive engine cycles according to equation 3); and FIG. 7 a graph of standard deviation $\sigma_i$ in the absence and presence of detonation, and as resulting from laboratory tests conducted at maximum load and in successive engine cycles. More specifically, the two dotted lines define the range within which standard deviation $\sigma_i$ varies in the absence of detonation, and the values outside this range are associated with the presence of detonation. Alongside an increase in the speed of engine 2, said range remains constant, whereas the standard deviation value $\sigma_i$ in the absence of detonation increases slightly.

Seeing as said range remains constant and the standard deviation value $\sigma_i$ varies only slightly alongside an increase in the speed of engine 2, a single standard deviation value $\sigma_0$ may be defined and used as a threshold by which to determine the detonation index over the entire speed range of engine 2.

FIG. 8 shows a flow chart of the operations implemented by central processing unit 6 at each combustion of engine 2 and relative to the second embodiment of the method according to the present invention.

The second embodiment is substantially similar to the first, except for the manner in which standard deviation $\sigma_i$ and detonation coefficient $KI_i$ are determined.

As shown in FIG. 8, and as in the first embodiment, each combustion is followed by acquisition detonation signal D generated by acceleration sensor 5 (Block 20); detonation signal D is wide-band filtered (Block 21), rectified (Block 22) and integrated in a time window (Block 23); logarithm $x_i$ of the integration result is calculated (Block 24); and a corresponding mean value $\mu_i$ as a function of the calculated $x_i$ value is calculated according to equation 2) (Block 25).

Unlike the first embodiment, however, a comparison is made at this point between the calculated logarithm value $x_i$ and the corresponding updated mean value $\mu_i$ (Block 26). If value $x_i$ is equal to or greater than the corresponding updated mean value $\mu_i$ (YES output of block 26), then value $x_i$, together with all the values $x_i$ calculated for the various cylinders 4 in successive combustions of engine 2 and also equal to or greater than a corresponding updated mean value $\mu_i$, defines a first hemidistribution hereinafter referred to as a "positive hemidistribution" (Block 27). Conversely, if value $x_i$ is less than the corresponding updated mean value $\mu_i$ (NO output of block 26), then value $x_i$, together with all the values $x_i$ calculated for the various cylinders 4 in successive combustions of engine 2 and also less than a corresponding updated mean value $\mu_i$, defines a second hemidistribution hereinafter referred to as a "negative hemidistribution" (Block 28).

At this point, the values $\sigma_i^-$ and $\sigma_i^-$ assumed respectively by a first and second standard-deviation-related quantity are calculated as a function of logarithm value $x_i$ and corresponding mean value $\mu_i$. More specifically, if logarithm value $x_i$ is a positive hemidistribution value, values $\sigma_i^+$ and $\sigma_i^-$ of the standard-deviation-related quantities are calculated according to the following equation (Block 29):

$$\begin{cases} \sigma_i^+ = \sqrt{\lambda_2 \cdot (x_i - \mu_i)^2 + (1 - \lambda_2) \cdot (\sigma_{i-1}^+)^2} & i \geq 2 \\ \sigma_i^- = \sqrt{(1 - \lambda_2) \cdot (\sigma_{i-1}^-)^2} & i \geq 2 \\ \sigma_1^+ = \sigma_1^- = 0 \end{cases} \quad 4)$$

where $\sigma_i^+$ and $\sigma_i^-$ are the standard-deviation-related quantity values calculated at the i-th repetition; $\sigma_{i-1}^+$ and $\sigma_{i-1}^-$ are the standard-deviation-related quantity values calculated at the previous repetition i–1; $\mu_i$ is the mean value calculated at the i-th repetition; $x_i$ is the second numeric value calculated at the i-th repetition; and $\lambda_2$ is a predetermined parameter.

Conversely, if logarithm value $x_i$ is a negative hemidistribution value, values $\sigma_i^+$ and $\sigma_i^-$ of the standard-deviation-related quantities are calculated according to the following equation (Block 30):

$$\begin{cases} \sigma_i^+ = \sqrt{(1 - \lambda_2) \cdot (\sigma_{i-1}^+)^2} & i \geq 2 \\ \sigma_i^- = \sqrt{\lambda_2 \cdot (x_i - \mu_i)^2 + (1 - \lambda_2) \cdot (\sigma_{i-1}^-)^2} & i \geq 2 \\ \sigma_1^+ = \sigma_1^- = 0 \end{cases} \quad 5)$$

where the various terms have the same meaning as above.

Figure 9:
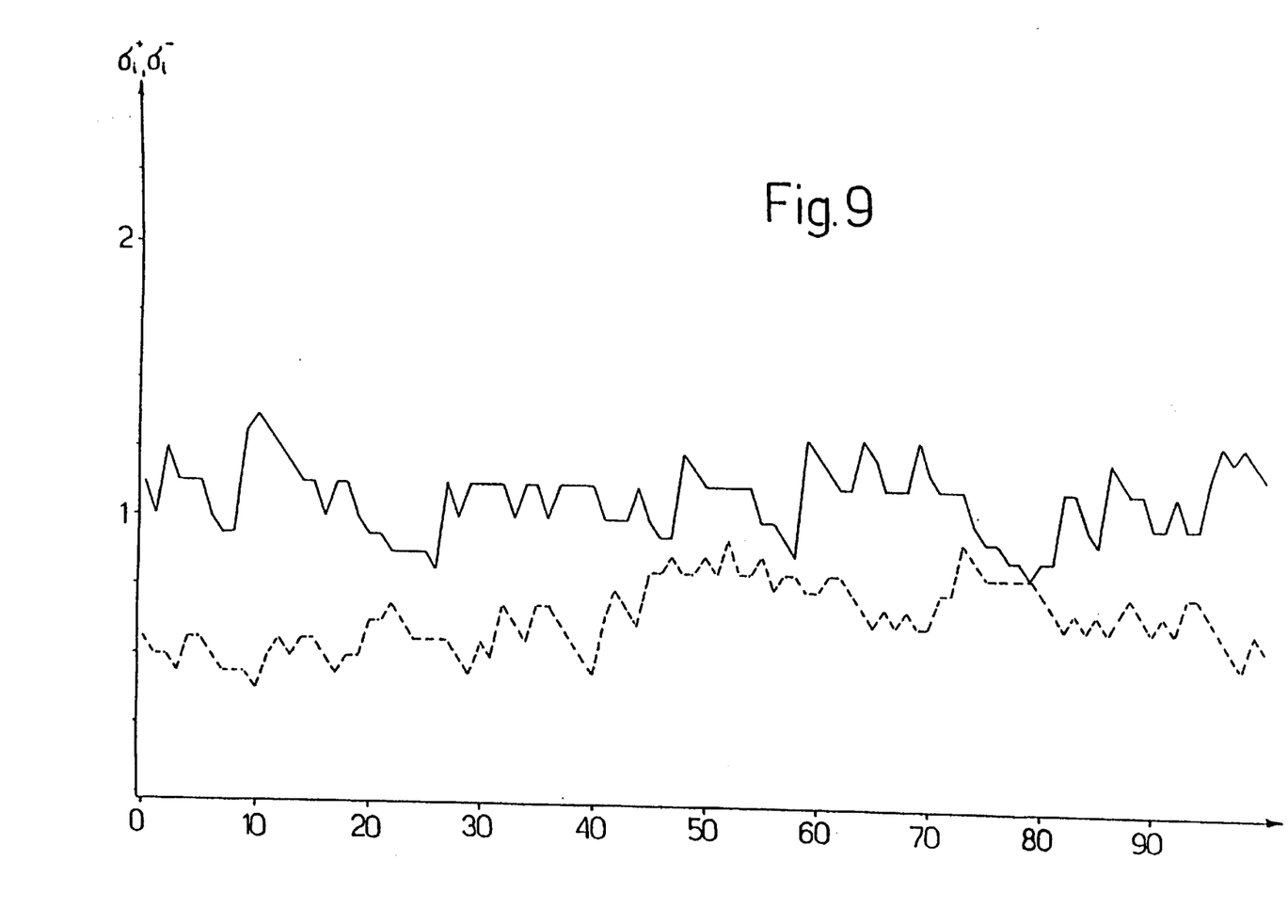
FIG. 9 shows a graph of a number of quantities relative to the second embodiment of the detection method according to the invention.

By way of example, FIG. 9 shows a graph of standard-deviation-related quantity values $\sigma_i^+$(continuous line) and $\sigma_i^-$ (dotted line) relative to successive engine cycles and in the presence of trace detonation.

The difference $\Delta\sigma_i$ between the previously calculated standard-deviation-related quantity values $\sigma_i^+$ and $\sigma_i^-$ is then calculated (Block 31).

Finally, difference value $\Delta\sigma_i$ is used to determine a detonation index $KI_i$ representing the detonation "propensity" of engine 2 (Block 32).

Purely by way of example, detonation index $KI_i$ may be determined using the following equation:

$$KI_i = \Delta\sigma_i - \Delta\sigma_0 \quad 6)$$

where $\Delta\sigma_i$ is the difference calculated in Block 32; and $\Delta\sigma_0$ is a predetermined reference value as a function of the speed of engine 2.

The advantages of the method according to the present invention are as follows.

First of all, it operates on the basis of a wide-band filtered signal to exploit the maximum possible amount of information relative to the standard deviation of cyclic variations, even if this, obviously, also means detecting the effects of other non-detonation-related phenomena.

The detonation coefficient is determined on the basis of a standard deviation obtained by weighting detonation contributions present in a large number of engine cycles, thus enabling an accurate picture to be drawn of the detonation phenomenon, and minor detonations to be detected for controlling trace detonation.

Finally, it provides for modeling the detonation phenomenon by means of a single parameter (standard deviation) and for defining a threshold that is valid for any operating situation and any type of engine, thus simplifying the processing required for effectively controlling operation of the engine, and so reducing component requirements.

Clearly, changes may be made to the method as described and illustrated herein without, however, departing from the scope of the present invention.

We claim:

1. A detonation detection method for internal combustion engines, characterized by comprising, in combination, the steps of:

a) generating a detonation signal (D) proportional to the intensity of a physical quantity related to the presence of detonation;

b) wide-band filtering said detonation signal (D) to generate a first intermediate signal;

c) rectifying said first intermediate signal to generate a second intermediate signal;

d) integrating said second intermediate signal to generate a first numeric value;

e) calculating the logarithm of said first numeric value to obtain a second numeric value ($x_i$);

f) calculating a mean value ($\mu_i$) as a function of said second numeric value ($x_i$);

g) calculating a value ($\sigma_i$; $\sigma_i^+$, $\sigma_i^-$) of at least a first standard-deviation-related quantity as a function of said second numeric value ($x_i$) and said mean value ($\mu_i$); and h) calculating a value of a detonation coefficient ($KI_i$) as a function of said value ($\sigma_i$; $\sigma_i^+$, $\sigma_i^-$) of said first standard-deviation-related quantity.

2. A method as claimed in claim 1, characterized in that said step b) comprises the step of filtering said detonation signal (D) between 5 and 25 kHz.

3. A method as claimed in claim 1, characterized in that said step d) is performed in a predetermined time window at the combustion stage.

4. A method as claimed in claim 3, characterized in that said integration time window commences, at said combustion stage, immediately after the top dead center position, and has a duration as a function of the speed and load of said engine (2).

5. A method as claimed in claim 1, characterized in that said step h) comprises the steps of:

i) determining a difference between said value ($\sigma_i$) of said first standard-deviation-related quantity and a threshold value ($\sigma_0$) to generate a third numeric value ($\Delta\sigma_i$); and l) calculating the value of said detonation coefficient ($KI_i$) as a function of said third numeric value ($\Delta\sigma_i$).

6. A method as claimed in claim 5, characterized in that said step b) comprises the step of filtering said detonation signal (D) between 5 and 25 kHz.

7. A method as claimed in claim 5, characterized in that said step d) is performed in a predetermined time window at the combustion stage.

8. A method as claimed in claim 5, characterized in that said step l) is performed using the equation:

$$KI_i = \Delta\sigma \cdot e^{(RPM/C)}$$

where $KI_i$ is the value of said detonation coefficient, $\Delta\sigma$, is said third numeric value, RPM is a number of revolutions per minute of said engine (2), and C is a predetermined constant.

9. A method as claimed in claim 8, characterized in that said threshold value ($\sigma_0$) used in step i) is predetermined and constant alongside a variation in the number of revolutions per minute (RPM) of said engine (2).

10. A method as claimed in claim 1, characterized by repeating said steps from a) to h) to generate a number (i) of said second numeric values ($x_i$), said mean values ($\mu_i$), said values ($\sigma_i$) of said first standard-deviation-related quantity, and said values of said detonation coefficient ($KI_i$).

11. A method as claimed in claim 10, characterized in that each of said mean values ($\mu_i$) is calculated using the equation:

$$\begin{cases} \mu_i = (1-\lambda_1) \cdot x_i + \lambda_1 \cdot \mu_{i-1} & i \geq 2 \\ \mu_1 = x_1 \end{cases}$$

where $\mu_i$ is the mean value calculated at the i-th repetition, $\mu_{i-1}$ is the mean value calculated at the previous repetition i−1, $x_i$ is the second numeric value calculated at the i-th repetition, and $\lambda_1$ is a predetermined parameter.

12. A method as claimed in claim 11, characterized in that each of said values ($\sigma_i$) of said first standard-deviation-related quantity is calculated using the equation:

$$\begin{cases} \sigma_i = \sqrt{\lambda_2 \cdot (x_i - \mu_i)^2 + (1-\lambda_2) \cdot \sigma_{i-1}^2} & i \geq 2 \\ \sigma_1 = 0 \end{cases}$$

where $\sigma_i$ is the value of said first standard-deviation-related quantity calculated at the i-th repetition, $\sigma_{i-1}$ is a value of said first standard-deviation-related quantity calculated at the previous repetition i−1, $\mu_i$ is the mean value calculated at the i-th repetition, $x_i$ is the second numeric value calculated at the i-th repetition, and $\lambda_2$ is a predetermined parameter.

13. A method as claimed in claim 1, characterized by also comprising the step of:

m) calculating a value ($\sigma_i^+$, $\sigma_i^-$) of a second standard-deviation-related quantity as a function of said second numeric value ($x_i$) and said mean value ($\mu_i$);

and in that said step h) comprises the step of:

n) calculating the value of said detonation coefficient ($KI_i$) as a function of said values ($\sigma_i^+$, $\sigma_i^-$) of said standard-deviation-related quantities.

14. A method as claimed in claim 13, characterized in that said step n) comprises the steps of:

p) determining a difference between said values ($\sigma_i^+$, $\sigma_i^-$) of said standard-deviation-related quantities to obtain a fourth numeric value ($\Delta\sigma_i$); and q) calculating the value of said detonation coefficient ($KI_i$) as a function of said fourth numeric value ($\Delta\sigma_i$).

15. A method as claimed in claim 14, characterized in that said step q) is performed using the equation:

$$KI_i = \Delta\sigma_i - \Delta\sigma_0$$

where $KI_i$ is the value of said detonation coefficient, $\Delta\sigma_i$ is said fourth numeric value, and $\Delta\sigma_0$ is a predetermined reference value.

16. A method as claimed in claim 13, characterized by repeating said steps from a) to n) to generate a number (i) of said second numeric values ($x_i$), said mean values ($\mu_i$), said values ($\sigma_i^+$, $\sigma_i^-$) of said standard-deviation-related quantities, and said detonation coefficients ($KI_i$).

17. A method as claimed in claim 16, characterized in that each of said mean values ($\mu_i$) is calculated using the equation:

$$\begin{cases} \mu_i = (1-\lambda_1) \cdot x_i + \lambda_1 \cdot \mu_{i-1} & i \geq 2 \\ \mu_1 = x_1 \end{cases}$$

where $\mu_i$ is the mean value calculated at the i-th repetition, $\mu_{i-1}$ is the mean value calculated at the previous repetition i−1, $x_i$ is the second numeric value calculated at the i-th repetition, and $\lambda_1$ is a predetermined parameter.

18. A method as claimed in claim 17, characterized in that, if the second numeric value ($x_i$) calculated in the same repetition is greater than or equal to the mean value ($\mu_i$) calculated in the same repetition, said values ($\sigma_i^+$, $\sigma_i^-$) of said standard-deviation-related quantities are calculated using the following equation:

$$\begin{cases} \sigma_i^+ = \sqrt{\lambda_2 \cdot (x_i - \mu_i)^2 + (1-\lambda_2) \cdot (\sigma_{i-1}^+)} & i \geq 2 \\ \sigma_i^- = \sqrt{(1-\lambda_2) \cdot (\sigma_{i-1}^-)^2} & i \geq 2 \\ \sigma_1^+ = \sigma_1^- = 0 \end{cases}$$

where $\sigma_i^+$ and $\sigma_i^-$ are the values of said standard-deviation-related quantities calculated at the i-th repetition, $\sigma_{i-1}^+$ and $\sigma_{i-1}^-$ are values of said standard-deviation-related quantities calculated at the previous repetition i−1, $\mu_i$ is the mean value calculated at the i-th repetition, $x_i$ is the second numeric value calculated at the i-th repetition, and $\lambda_2$ is a predetermined parameter.

19. A method as claimed in claim 17 or 18, characterized in that, if the second numeric value ($x_i$) calculated in the same repetition is less than the mean value ($\mu_i$) calculated in the same repetition, said values ($\sigma_i^+$, $\sigma_i^-$) of said standard-deviation-related quantities are calculated using the following equation:

$$\begin{cases} \sigma_i^+ = \sqrt{(1-\lambda_2) \cdot (\sigma_{i-1}^+)^2} & i \geq 2 \\ \sigma_i^- = \sqrt{\lambda_2 \cdot (x_i - \mu_i)^2 + (1-\lambda_2) \cdot (\sigma_{i-1}^-)^2} & i \geq 2 \\ \sigma_1^+ = \sigma_1^- = 0 \end{cases}$$

where $\sigma_i^+$ and $\sigma_i^-$ are the values of said standard-deviation-related quantities calculated at the i-th repetition, $\sigma_{i-1}^+$ and $\sigma_{i-1}^-$ are values of said standard-deviation-related quantities calculated at the previous repetition i−1, $\mu_i$ is the mean value calculated at the i-th repetition, $x_i$ is the second numeric value calculated at the i-th repetition, and $\lambda_2$ is a predetermined parameter.

\* \* \* \* \*